Figure 2:
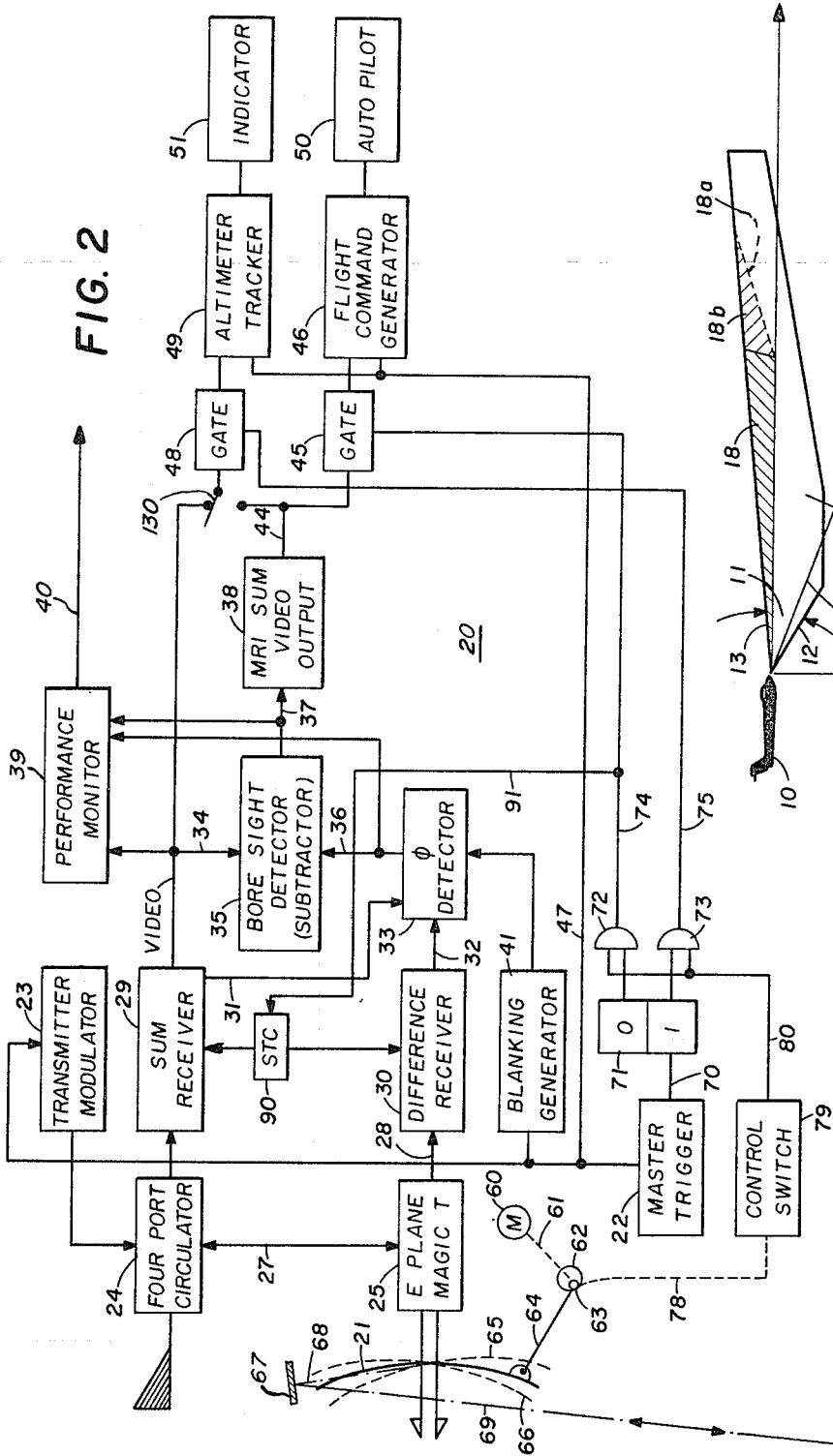

Oct. 4, 1966   G. M. BARNEY   3,277,467
TIME SHARING RADAR-ALTIMETER
Filed Dec. 16, 1964   2 Sheets-Sheet 1

Oct. 4, 1966     G. M. BARNEY     3,277,467
TIME SHARING RADAR-ALTIMETER
Filed Dec. 16, 1964     2 Sheets-Sheet 2

United States Patent Office 3,277,467
Patented Oct. 4, 1966

3,277,467
TIME SHARING RADAR-ALTIMETER
George M. Barney, Dallas, Tex., assignor to Texas Instruments Incorporated, Dallas, Tex., a corporation of Delaware
Filed Dec. 16, 1964, Ser. No. 418,734
9 Claims. (Cl. 343—7.3)

This invention relates to aircraft radar, and more particularly, to development of radar altitude information in the forward looking scan cycle when the radar beam is directed above the horizon or above a flight vector.

In forward looking radar, pulsed microwave energy may be directed to scan ahead of the aircraft in elevation from below to above the horizon or alternatively, from below to above the flight vector. Prior radar systems have successfully used the forward looking radar transmitter power with a separate altimeter receiver channel to derive radar altitude information.

In radars adapted for low level flights, and, more particularly, in a terrain following radar, with respect to which the present invention will be described, the first return signal at any given vertical scan angle is compared with a reference template signal. If the return signal occurs prior to the template signal, then a climb command control signal will be developed which is dependent upon the time difference between the first return signals and the template signal and the range. If the return signal occurs after the template signal, then a dive command signal will be generated. Various degrees of dive and climb command signals are produced in between the two extremes.

The function of a terrain following radar is to supply information to the pilot or autopilot in order to permit or require a close contour terrain following flight. By control of an autopilot, for example, the aircraft automatically will follow a path having a predetermined terrain clearance. It has been found desirable to provide altimeter information for use by the pilot. Such information can be developed in a terrain following radar, for example, without the addition of any substantial system components.

Altimeter information is developed in accordance with the present invention by utilizing on a time sharing basis the same channels as employed in the forwardly directed radar by limiting altimeter tracking to that portion of the elevation scan cycle in which the radar beam is above the flight vector. The use is further dependent upon the early returns during such portion of the scan cycle.

In accordance with the present invention, part of the transmitted energy is directed downwardly, during the portion of the elevation antenna scan which is above the flight vector. In low level flight, it can safely be assumed that any radar signal received from a target ahead of the aircraft and above the horizon will be much later than a return from the terrain under the aircraft. During the time when the forward looking radar beam is above the flight vector and for a predetermined time gate after each transmitted pulse, the forward looking radar receiver is used to supply radar altitude information. Alternate energization of the radar video output channel and an altimeter channel during each pulse-receive cycle, is accomplished by suitable switching circuits referenced to the instant of transmission of each pulse.

An object of the present invention is to provide altimeter information in a forward looking radar while minimizing weight, space, and complexity consideration, and, specifically, by eliminating the requirement for a separate receiver channel.

More particularly, in accordance with the invention, a radar, having a beam scanning in elevation ahead of an aircraft, is provided with means for directing part of the transmitted energy downward to the terrain during that portion of each scan cycle when the beam is above a predetermined forwardly directed vector. A receiving circuit is responsive to vertical and forward returns of the transmitted energy. A tracking unit coupled to the receiver circuit employs the vertical return to measure the altitude. A control unit renders the tracking unit operative during a predetermined initial interval following each energy transmission only when the beam is above the predetermined vector.

Figure 1:
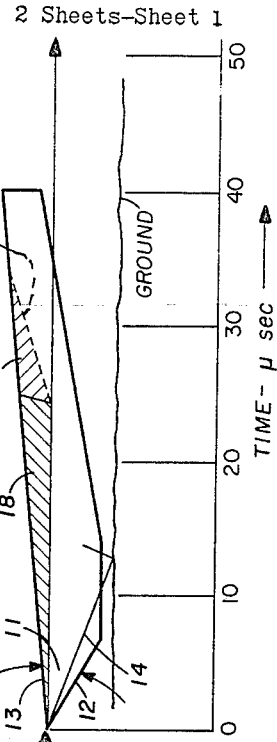
Figure 3:
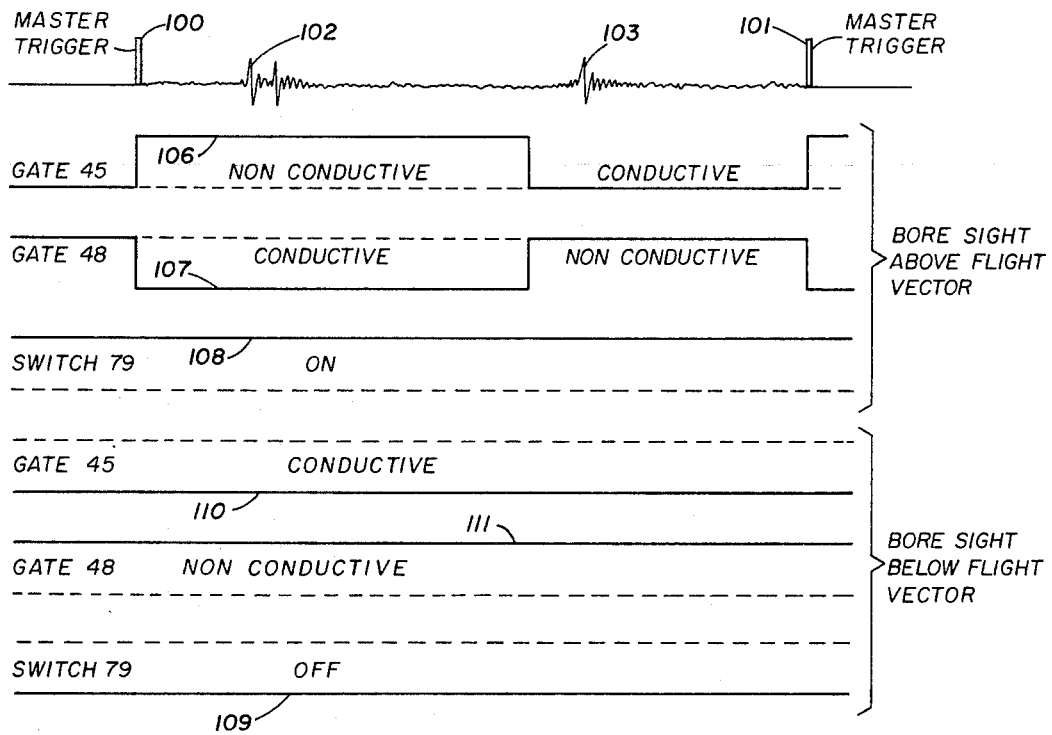
Figure 4:
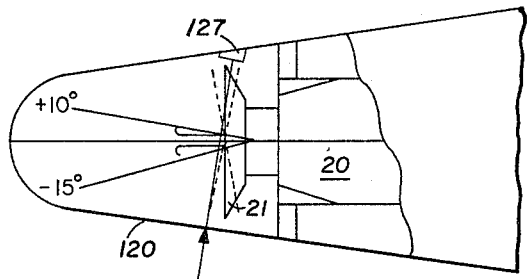
Figure 5:
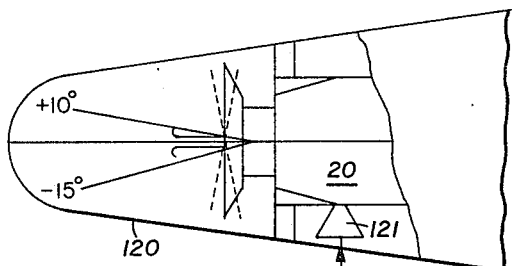

For a more complete understanding of the present invention and for further objects and advantages thereof, reference may now be had to the following description taken in conjunction with the accompanying drawings in which:

FIGURE 1 illustrates terrain following radar operation;
FIGURE 2 illustrates a system embodying the present invention;
FIGURE 3 illustrates operation of portions of the system of FIGURE 2;
FIGURE 4 illustrates one installation for carrying out the present invention; and
FIGURE 5 illustrates a modified installation.

FIGURE 1 of the accompanying drawings includes a diagram which will be used in describing the functions of a terrain following radar. An aircraft 10 is to be automatically maintained substantially at a predetermined altitude above the terrain. The aircraft 10 is provided with an antenna for transmitting and receiving pulses of electromagnetic energy. By way of example, the antenna may transmit pulses of 16.5 kilomegacycles energy for 0.2 microsecond at a predetermined repetition rate of 3600 pulses per second. A monopulse beam thus produced is swept through a predetermined vertical scan angle 11 between lower limit 12 and upper limit 13 extending from about 15° below the flight vector of the aircraft to about 10° above the flight vector. The antenna scan is, of course, referenced or stabilized to the flight vector of the aircraft.

The monopulse beam moves through a complete scan cycle, i.e., from its lower limit to its upper limit and then back to its lower limit of movement at a predetermined rate which may be about two cycles per second. Thus, the antenna scans a predetermined sector in front of the aircraft four times each second, twice during its upward movement and twice on its downward movement. A typical maximum range of the radar, i.e., from the aircraft 10 to the front of the scan profile, may be around 15,000 feet, when the aircraft is to be maintained at a selected altitude between 200 feet and 1500 feet above the terrain.

The radar of this embodiment is of the monopulse type in which the relatively sharp beam is formed. The beam may be steered, either by varying geometrical relationships in the radar antenna, or by varying the phase in a phased array antenna, both of which are well known. In either case, the bore sight of the radar unit may be varied in elevation to scan the path ahead of the aircraft and to develop, from the return signals, a video pulse representative of the first return echo. In the terrain following radar to which the present invention is particularly applicable, the time occurrence of the first return of the radar beam is compared with the time occurrence of a template pulse. From this comparison, the command signal is generated to actuate an autopilot in the aircraft, or provide a visual signal for the pilot so that the aircraft will either be caused to dive or climb, as the case may be, in order to maintain the desired clearance above the terrain.

The area of the scan profile represented by the closed pattern or template of FIGURE 1 is the climb sector.

If the radar locates any object within the template, a command is generated and set to an autopilot to program a climb for the aircraft. The area outside of the profile is the dive sector. When an object is detected in the dive sector and no objects are detected in the climb sector, a dive command signal is generated which programs a descent for the aircraft. If no objects at all are detected by the radar, a signal is generated to indicate a possible failure, or malfunction, of the system.

In accordance with the present invention, the same channels as employed for developing the terrain following information are employed in order to provide altimeter data. The portion of the template employed for this purpose is that generally represented by the crosshatched zone 18.

FIGURE 2 illustrates a conventional monopulse radar system to which the present invention is applied. The radar system 20 operates in conjunction with a dished radar antenna 21.

The radar system 20 may comprise any conventional forward looking radar system, although in a preferred embodiment of the invention, a monopulse resolution improved radar (MRI) is preferred. Such a system comprises a pulse repetition frequency (PRF) controlled master trigger generator 22 which activates a transmitter modulator 23 to initiate the emission of the radar pulses which are fed through an isolating device 24, a four-port ferrite circulator, and an E-plane magic T 25, to the radar antenna 21. The isolating device 24 is used to prevent the transmitted pulses from being sent to the receiver. The pulsing of the transmitter 23 causes a radar carrier signal pulse to be transmitted from the antenna 21. The electromagnetic energy radiated from the antenna 21 travels through space until striking an object such as the terrain or an obstacle above the terrain. The object will cause a reflected pulse of the carrier to be received by the antenna 21. The E-plane magic T 25 provides a sum output and a difference output on channels 27 and 28, respectively. The sum output is applied to a sum receiver 29 by way of the circulator 24. The difference signal on channel 28 is applied to the difference receiver 30. A summation IF signal and a difference IF signal are then applied by way of channels 31 and 32, respectively, to a phase detector 33. The video output of the sum receiver is applied by way of channel 34 to a bore sight detector or subtractor unit 35. The output of the phase detector 33 is applied by way of channel 36 to bore sight detector 35. The output of the detector 35 is applied by way of channel 37 to a monopulse resolution improvement sum video output unit 38. The output signals on channels 34, 36 and 37 are supplied to a performance monitor unit 39 to provide a radar fail signal on channel 40.

At the same time the master trigger pulse is transmitted to the transmitter 23 from the generator 22, the pulse is also applied by way of a blanking pulse generator 41 to the phase detector 33. By use of the system thus far disclosed, there is produced on the output channel 44 a high resolution signal representative of the returns to the antenna 21. This signal is then applied by way of gate 45 as one input to a flight command function generator 46. The output signal on channel 34 is applied by way of gate 48 to an altimeter tracker unit 49. The output of the flight command unit 46 is applied to an autopilot 50. The output of the altimeter tracker 49 is applied to an indicator 51. The second input to both the command unit 46 and the tracker 49 is the master trigger pulse applied by way of channel 47.

In accordance with the present invention, the gates 45 and 48 are alternately enabled so that early returns on channel 34, when the antenna is above the flight vector, will be applied to the altimeter tracker to provide altimeter information for the indicator 51. Late returns on channel 44 are applied by way of gate 45 to the flight command function generator 46 when the antenna bore sight is above the flight vector. When the antenna bore sight is below the flight vector, all the returns on channel 44 are applied to the command unit 46.

In FIGURE 2, a motor 60 diagrammatically represents the antenna scan drive. The motor 60 is coupled by linkage 61 to a crank 62. A crank arm 63 is linked to the antenna 21 by the strut 64. By means of the crank 62, the antenna will be rotated from the down-scan position represented by the dotted line 65, to the up-scan position represented by the dotted line 66. A secondary reflector 67 is mounted on the aircraft frame in such a position that when the bore sight of antenna 21 is above the flight vector, some of the radiated energy will travel along the path 68 so that it will be reflected downwardly, as along path 69, to the terrain below the aircraft. The returns from this vertical transmission will then actuate the antenna 21 and the system to provide an early return signal to the radar system only when the bore sight of the antenna is above the flight vector.

As illustrated in FIGURE 1, there are no early returns from objects in the zone 18, so that this zone may be employed for altimeter sensing. Thus, the master trigger is coupled by way of channel 70 to a monostable multivibrator 71. The two states of the multivibrator 71 are applied by way of AND gates 72 and 73 and channels 74 and 75 to gates 45 and 48, respectively. Gate 45 is normally conductive. Gate 48 is normally non-conductive. The linkage 78 extends from the crank arm 63 on crank 62 to an on-off switch unit 79. When the bore sight of antenna 21 is above the flight vector, a control voltage will appear on the channel 80 so that the AND gates 72 and 73 will be enabled. Thus, so long as the bore sight of the antenna 21 is above the flight vector, the multivibrator 71 will be actuated by each master trigger and will render gate 45 non-conductive and gate 48 conductive for time intervals determined by the period of the multivibrator 71. During this interval, the early returns of energy traveling along path 68–69 will be effective to actuate the altimeter tracker 49. Thereafter, the late returns from the forwardly directed energy will serve to actuate the flight command function generator 46.

It will be noted that a sensitivity time constant control unit 90 serves to control sensitivity of the sum and difference of the receivers 29 and 30. Normally, early high energy returns are attenuated more than late returns. The receiver gains are increased with time so that late and weaker returns will be amplified to present output signals of usable amplitude for all ranges. A channel 91 extends from the output of the AND gate 72 to the control unit 90 to disable the same during the same time interval that the gate 45 is non-conductive and the gate 48 is conductive. By this means, a high amplitude video signal will be effectively applied to the altimeter tracker 49 to provide a more positive altimeter indication. However, when gate 45 is conductive and gate 48 is non-conductive, the sensitivity time constant control unit 90 will then be effective to control the gains of receivers 29 and 30.

If desired, the time constant of the monostable multivibrator 71 may be varied by suitable linkage to the crank 62 so that the time constant will vary in accordance with a function represented by the dotted line 18a. Such a mode of operation would be permissible since the forward looking radar need not operate in the sector or zone 18b.

The operation of the system may further be understood by referring to FIGURE 3. The master trigger pulses 100 and 101 are plotted along a time scale on which the returns are also plotted. When the bore sight is above the flight vector, the first returns 102 would represent altimeter information. The late return 103 would represent the presence of an object above the flight vector but at a substantial range. During the time interval that the bore sight is above the flight vector, the gate 45 is non-conductive for the period of the control pulse 106 and is conductive for the remainder of the pulse cycle. The gate 48 is conductive for transmission to the altimeter of the early return signals 102, and specifically for the duration of the pulse 107. During the entire period that the bore sight is above the flight vector, the switch 79 is on so that both of the AND gates 72 and 73 are enabled. The on condition of the switch 79 is represented by the line 108.

During the portion of the elevation scan cycle when the bore sight is below the flight vector, the switch unit 79 is off, as represented by the line 109. Thus, the gate 45 is always conductive so that all of the returns will be transmitted by way of gate 45 to the flight command function generator. Gate 48 is maintained non-conductive so that no signals will be transmitted to the altimeter unit. In this case, the conditions of the gates 45 and 48 are indicated by the lines 110 and 111.

In FIGURE 4, an installation has been illustrated wherein the radar unit 20 is mounted in the nose 120 of an aircraft. The antenna 21 is provided with a suitable drive motor, not shown, so that the antenna will scan from plus 10° to minus 15°. The reflector 127 has been shown as mounted in the nose 120 as to direct some of the electromagnetic energy downward when the antenna beam is above the flight vector.

An alternative mode of operation is illustrated in FIGURE 5 wherein the radar unit 20 is similarly mounted in the nose 120. However, in this case, an altimeter antenna 121 has been added. Part of the radar pulse energy from the transmitter modulator 23, FIGURE 2, may be fed by way of a suitable directional coupler such as is well known in the art, to the separate antenna 121. Returns received by the antenna 121 will then be fed back into the radar circuit so that the same radar channel will be employed for the altimeter information as for the forward looking radar information. The altimeter return pulses are applied to the radar channel only when the antenna beam is above the horizon or flight vector.

Where a good monopulse signal is obtained from the fraction of the energy beamed downward along path 68–69, the altimeter tracking unit may be connected at its input directly to the channel 44 (by switching means 130 connected to its alternate position), FIGURE 2, and thus use the same video output as is employed by the command unit 46. In such case, the altimeter unit would be gated on and off as shown in FIGURE 2. Similarly, the the flight command function generator would be gated off for the early portion of the returns when the antenna bore sight is above the flight vector.

The monopulse radar of FIGURE 2 has been shown in block form. The system is in general known and is further described in Introduction to Radar Systems, by Skolnik, McGraw-Hill Book Company, Inc., New York, 1962, at page 175 et seq. It will be understood, however, that other radar systems may combine search and altimeter functions in a single channel as above described. Thus, the invention is not limited to monopulse operation nor to terrain following flight control. It is useful to provide altitude information in low level operations.

Having described the invention in connection with certain specific embodiments thereof, it is to be understood that further modifications may now suggest themselves to those skilled in the art, and it is intended to cover such modifications as fall within the scope of the appended claims.

What is claimed is:

1. In an aircraft radar which scans in elevation ahead of said aircraft from below to above a horizon with a beam of electromagnetic pulses, the combination which comprises:
   (a) means operable to beam RF pulses substantially directly to the terrain below said aircraft,
   (b) means to sense early returns of the vertically directed pulses,
   (c) an amplifying channel gated to treat signals representative of said early returns,
   (d) means coupled to said channel referenced to transmission of each of said pulses directed above said horizon to track said early returns to determine elevation of said aircraft, and
   (e) means coupled to said channel for amplifying late returns from forwardly directed RF pulses.

2. The combination set forth in claim 1 in which a reflector is positioned to interrupt and direct downward a portion of said beam when said beam is directed above said horizon.

3. The combination set forth in claim 1 in which an auxiliary antenna directed downward is pulsed coincident with each pulse in said beam, and returns therefrom are applied to said channel only when said beam is directed above the horizon.

4. In a radar wherein a beam cyclicly scans in elevation ahead of an aircraft with returns from objects being processed by a receiver channel in said radar, the combination which comprises:
   (a) means for sending pulsed electromagnetic energy directly downward to the terrain during that portion of each scan cycle wherein the radar beam is above a predetermined forwardly directed vector,
   (b) means for applying returns from said energy to said channel,
   (c) timing means connected to said channel for measuring the travel time of said return of said energy, and
   (d) gating means for rendering said timing means operative exclusively during a predetermined initial portion of each transmission cycle only when said beam is above said vector.

5. In an aircraft radar, the combination which comprises:
   (a) means including an antenna for beaming RF pulses ahead of said aircraft,
   (b) means for varying the geometrical properties of said antenna to sweep the elevation of said beam from below to above the horizon,
   (c) means for concurrently transmitting directly to the terrain below said aircraft some energy from each RF pulse in said radar when said elevation is above the horizon,
   (d) a return signal channel,
   (e) first return signal utilization means connected to said channel for vertical return signals,
   (f) second return signal utilization means connected to said channel for forward return signals, and
   (g) control means for limiting transmission of said first return signals through said channel to those pulses when said beam is above the horizon.

6. The combination set forth in claim 5 in which said radar has monopulse radar improvement and the two utilization means are alternately connected to the video output terminal of the monopulse radar improvement system when said beam is above the horizon.

7. The combination set forth in claim 5 in which said radar has monopulse radar improvement and includes a sum channel and a difference channel, and the first signal utilization means is connected to the output of the sum channel.

8. In monopulse aircraft radar operation in which a beam scans in elevation ahead of said aircraft from below to above predetermined forwardly directed vector, the method which comprises:
   (a) transmitting a portion of the energy of each of the RF pulses in said radar directly to the terrain below said aircraft while said beam is above said vector,
   (b) sensing returns of said portion,
   (c) transmitting said returns through said radar during an initial interval following each of said pulses directed above said vector, and (d) tracking said returns referenced to the instant of RF pulse transmission to determine elevation while concurrently scanning said elevation.

9. In monopulse aircraft radar operation in which a beam scans in elevation ahead of said aircraft from below to above the horizon, the method which comprises:
 (a) transmitting a portion of the energy directly to the terrain below said aircraft from each RF pulse beamed above said horizon,
 (b) sensing returns of said portion,
 (c) transmitting said returns through said radar during an initial interval following each transmitted pulse directed above said horizon, and
 (d) tracking said returns referenced to the instant of RF pulse transmission to determine elevation while concurrently scanning said elevation.

No references cited.

CHESTER L. JUSTUS, *Primary Examiner.*

T. H. TUBBESING, *Assistant Examiner.*